United States Patent
Han et al.

(10) Patent No.: US 11,722,632 B2
(45) Date of Patent: Aug. 8, 2023

(54) VIDEO ACQUISITION METHOD AND ELECTRONIC APPARATUS

(71) Applicant: Lenovo (Beijing) Limited, Beijing (CN)

(72) Inventors: Junning Han, Beijing (CN); Rongbin Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/677,971

(22) Filed: Feb. 22, 2022

(65) Prior Publication Data
US 2023/0054468 A1    Feb. 23, 2023

(30) Foreign Application Priority Data
Aug. 23, 2021   (CN) .......................... 202110966395.0

(51) Int. Cl.
| | |
|---|---|
| *H04N 5/268* | (2006.01) |
| *H04N 23/66* | (2023.01) |
| *G10L 25/57* | (2013.01) |
| *H04N 5/272* | (2006.01) |
| *H04R 1/08* | (2006.01) |
| *H04R 3/00* | (2006.01) |
| *H04N 23/90* | (2023.01) |
| *H04R 1/40* | (2006.01) |

(52) U.S. Cl.
CPC .............. *H04N 5/268* (2013.01); *G10L 25/57* (2013.01); *H04N 5/272* (2013.01); *H04N 23/66* (2023.01); *H04R 1/08* (2013.01); *H04R 3/005* (2013.01); *H04N 23/90* (2023.01); *H04R 1/406* (2013.01)

(58) Field of Classification Search
CPC ........ H04N 5/268; H04N 5/272; H04N 23/66; H04N 23/90; H04N 23/60; H04N 23/951; H04N 23/632; H04N 23/667; H04N 5/76; G10L 25/57; H04R 1/08; H04R 3/005; H04R 1/406
See application file for complete search history.

(56) References Cited

U.S. PATENT DOCUMENTS 6,278,884 B1 *   8/2001   Kim .................... B60R 25/0227
                                                       348/14.02
8,564,681 B2 * 10/2013   Yamamoto ............ G03B 17/00
                                                       348/222.1

(Continued)

FOREIGN PATENT DOCUMENTS

| CN | 103237178 A | 8/2013 |
|---|---|---|
| CN | 107682622 A | 2/2018 |

*Primary Examiner* — Chiawei Chen
(74) *Attorney, Agent, or Firm* — Anova Law Group, PLLC

(57) ABSTRACT

A video acquisition method includes calling a first image collection device and a sound collection device based on a camera mode, collecting first image data of a first space in real-time through the first image collection device, collecting audio data covering a spatial environment including the first space in real-time through the sound collection device, processing the audio data in real-time based on an audio processing engine, in response to determining, through the audio processing engine, that the audio data indicates that a target sound source exists in a second space different from the first space, calling a second image collection device, and collecting second image data of the second space in real-time through the second image collection device.

18 Claims, 4 Drawing Sheets

(56) References Cited

U.S. PATENT DOCUMENTS

| | | | |
|---|---|---|---|
| 10,931,919 B2* | 2/2021 | Tsui | H04N 5/2628 |
| 2009/0122147 A1* | 5/2009 | Takashima | H04N 23/667 |
| | | | 600/300 |
| 2012/0147204 A1* | 6/2012 | Jeong | H04N 5/772 |
| | | | 348/E5.045 |
| 2014/0307108 A1* | 10/2014 | Konicek | G03B 13/02 |
| | | | 348/207.1 |
| 2020/0351452 A1* | 11/2020 | Jung | H04N 7/181 |
| 2023/0045536 A1* | 2/2023 | Kee | H04R 3/005 |

* cited by examiner

VIDEO ACQUISITION METHOD AND ELECTRONIC APPARATUS

CROSS-REFERENCE TO RELATED APPLICATION

This application claims priority to Chinese Patent Application No. 202110966395.0, filed on Aug. 23, 2021, the entire content of which is incorporated herein by reference.

TECHNICAL FIELD

The present disclosure generally relates to the video acquisition technology field and, more particularly, to a video acquisition method and an electronic apparatus.

BACKGROUND

With development of video acquisition and sharing, more and more people share their videos on application software. Current acquisition methods include 1) recording based on a rear camera to obtain a video, 2) recording based on a front camera to obtain a video, and 3) recording based on the rear camera and the front camera to obtain a video.

When a video is obtained using the above recording method, during recording using the rear camera, when there is a need to record an image in a space corresponding to the front camera, the rear camera needs to be turned off manually and then the front camera needs to be turned on manually, resulting in discontinuous video. A user needs to perform post-processing, such as editing. In addition, because the user needs to manually switch between the front camera and the rear camera, the operation is cumbersome.

SUMMARY

Embodiments of the present disclosure provide a video acquisition method. The method includes calling a first image collection device and a sound collection device based on a camera mode, collecting first image data of a first space in real-time through the first image collection device, collecting audio data covering a spatial environment including the first space in real-time through the sound collection device, processing the audio data in real-time based on an audio processing engine, in response to determining, through the audio processing engine, that the audio data indicates that a target sound source exists in a second space different from the first space, calling a second image collection device, and collecting second image data of the second space in real-time through the second image collection device.

Embodiments of the present disclosure provide an electronic apparatus, including a first call circuit, a first collection circuit, a processing circuit, a second call circuit, and a second collection circuit. The first call circuit is configured to call a first image collection device and a sound collection device based on a camera mode. The first collection circuit is configured to collect first image data of a first space in real-time through the first image collection device and audio data covering a spatial environment including the first space through the sound collection device in real-time. The processing circuit is configured to process the audio data in real-time based on an audio processing engine. The second call circuit is configured to, in response to determining, through the audio processing engine, that the audio data indicates that a target sound source exists in the second space different from the first space, call the second image collection device. The second acquisition circuit is configured to collect second image data in a second space in real-time through the second image collection device.

Embodiments of the present disclosure provide and electronic apparatus, including a processor. The processor is configured to call a first image collection device and a sound collection device based on a camera mode, collect first image data of a first space in real-time through the first image collection device, collect audio data covering a spatial environment including the first space in real-time through the sound collection device, process the audio data in real-time based on an audio processing engine, in response to determining, through the audio processing engine, that the audio data indicates that a target sound source exists in a second space different from the first space, call a second image collection device, and collect second image data of the second space in real-time through the second image collection device.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Solutions and features of the present disclosure are described with reference to the accompanying drawings.

Various modifications may be made to embodiments of the present disclosure. Therefore, the above description should not be regarded as a limitation, but merely as examples of embodiments. Those skilled in the art will think of other modifications within the scope and spirit of the present disclosure.

The accompanying drawings, which are incorporated in and constitute a part of this specification, illustrate embodiments of the present disclosure. The accompanying drawings together with the general description of the present disclosure above and the detailed description of embodiments below are used to explain the principle of the present disclosure.

These and other features of the present disclosure will become apparent from the following description of embodiments of non-limiting examples with reference to the accompanying drawings.

Although the present disclosure has been described with reference to some specific examples, those skilled in the art are able to implement many other equivalents of the present disclosure, which have the features as claimed in the claims and are therefore within the scope of the present disclosure.

The above and other aspects, features, and advantages of the present disclosure will become more apparent with the following detailed description and in connection with the accompanying drawings.

Specific embodiments of the present disclosure are described with reference to the accompanying drawings. However, embodiments of the present disclosure are merely examples of the present disclosure, which may be implemented in a plurality of manners. Well-known and/or repeated functions and structures are not described in detail to avoid obscuring the present disclosure with unnecessary or redundant details. Therefore, specific structural and functional details of the present disclosure are not intended to limit the present disclosure, but merely serve as a basis for the claims and a representative basis for teaching those skilled in the art to use the present disclosure with any suitable detailed structure.

This specification may use the terms "in one embodiment," "in another embodiment," "in yet another embodiment," or "in other embodiments," which may all refer to one or more of same or different embodiments of the present disclosure.

Figure 1:
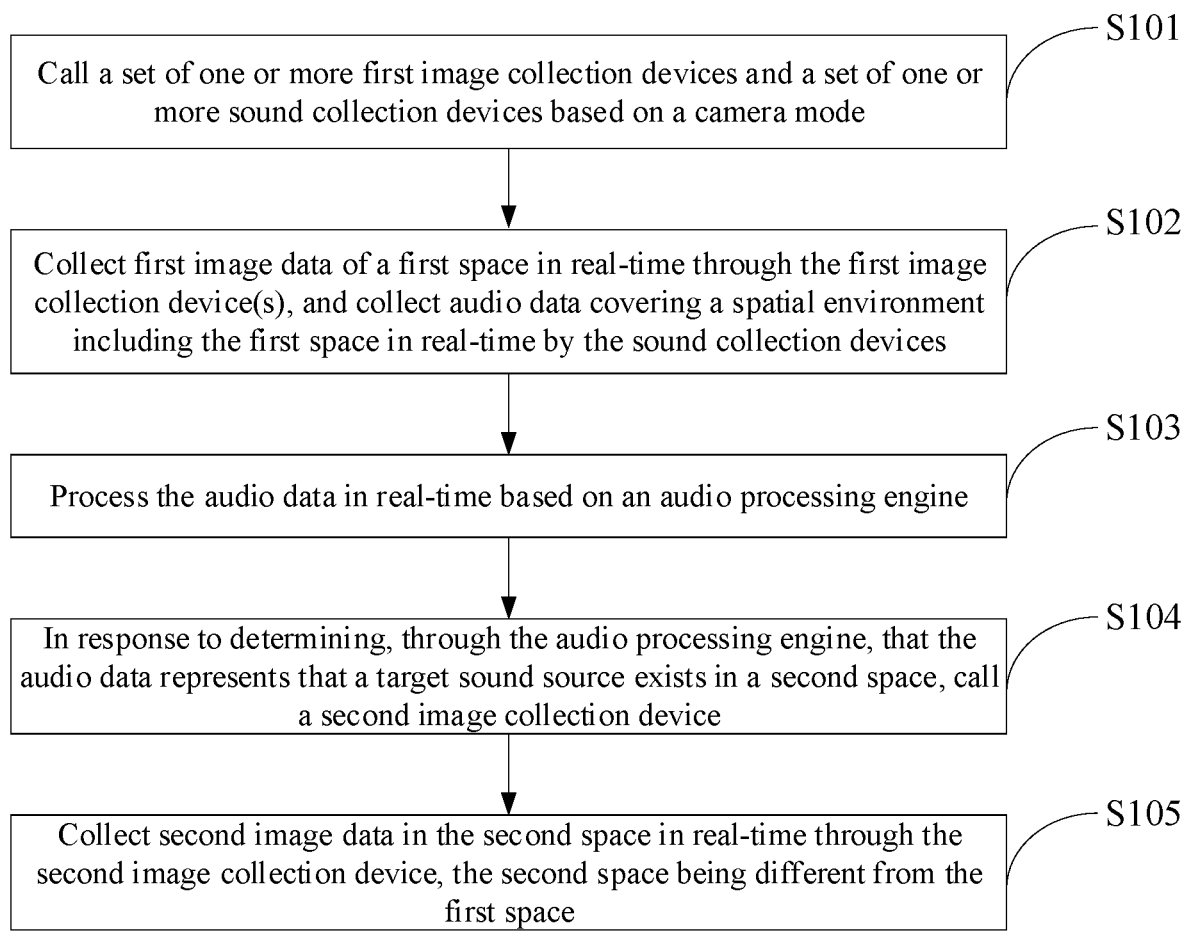
FIG. 1 illustrates a schematic flowchart of a video acquisition method according to some embodiments of the present disclosure.

In order to facilitate the understanding of the present disclosure, a video acquisition method of the present disclosure is described in detail. In practical applications, an execution object of the video acquisition method in embodiments of the present disclosure may include a server or a processor, etc. In order to facilitate explanation, the processor is used for the detailed description below. FIG. 1 illustrates a schematic flowchart of a video acquisition method according to some embodiments of the present disclosure. The method includes the following steps.

At S101, a set of one or more first image collection devices and a set of one or more sound collection devices are called based on a camera mode.

In some embodiments, the camera modes of the electronic apparatus may include at least a first recording mode and a second recording mode. The first recording mode and the second recording mode may be applied in different scenarios. In the first recording mode and the second recording mode, the electronic apparatus may call the set of one or more first image collection devices and at the same time call other image collection devices to collect image data. The electronic apparatus may also set another camera mode as needed, which is not limited by embodiments of the present disclosure.

The set of one or more first image collection devices may include one first image collection device or a plurality of first image collection devices. When the plurality of first image collection devices are included, collection spaces corresponding to the first image collection devices may be same or may be different and without an overlapping space.

Further, the electronic apparatus may be provided with a set of one or more sound collection devices. The electronic apparatus may call the sound collection devices according to the camera mode. At least three sound collection devices may be included. The sound collection devices may be configured to collect audio data of a spatial environment where the electronic apparatus is currently located.

At S102, first image data of a first space is collected in real-time through the first image collection device(s), and audio data covering a spatial environment including the first space is collected in real-time by the sound collection devices.

After a current camera mode of the electronic apparatus is determined, the first image collection devices and the sound collection devices that can be called in the current camera mode may be checked. Then, the first image collection device(s) may be called to collect the first image data of the first space in real-time. The first space may be determined by a collection angle and a collection distance corresponding to the first image collection device(s). A maximum collection angle and a maximum collection distance of the first image collection device(s) may be determined based on attribute parameters of the first image collection device(s). However, in some embodiments, an actual collection angle and collection distance may be adjusted according to actual needs. The first image data may include an image and image position information corresponding to the first space. The image position information may include a distance and/or an angle of some elements in the image corresponding to the first image collection device(s).

Meanwhile, the sound collection device may be called to collect the audio data covering the spatial environment including the first space in real-time. The collection distance of the sound collection device may be set to be the same as the collection distance of the first image collection device. In practical applications, the sound collection device may collect the audio data in the spatial environment of the current space where the electronic apparatus is located. That is, the audio data may include a sound wave and sound wave position information in the first space and a sound wave and sound wave position information outside the first space. The first space may be included in the current space.

At S103, the audio data is processed in real-time based on an audio processing engine.

In some embodiments, the electronic apparatus may include the audio processing engine. The audio processing engine may be configured to process the audio data collected by the sound collection device. For example, all the sound waves may be separated individually. An attribute of the sound wave may be determined to determine to which user the sound wave belongs based on the attribute of the sound wave. A position of a sound source may be determined to determine whether the sound source satisfies a preset condition based on the position. For example, the preset condition may include that the distance from the sound collection device is less than a preset threshold.

At S104, in response to determining, through the audio processing engine, that the audio data represents that a target sound source exists in a second space, a second image collection device is called.

In some embodiments, the second space may include a plurality of sound sources. Whether the sound source is the target sound source may be determined based on the position information of each sound source and sound parameter information.

In some embodiments, parameters of all the sound collection devices may be calculated by the audio processing engine to obtain a distance and an angle between each sound source and the sound collection device. The parameters of the sound collection device may include a relative position relationship between the sound collection devices and strength and a time point of a same sound source that is collected by each sound collection device. Based on the distance and the angle between the sound source and the sound collection device, a sound source with position information within the second space may be determined. A sound print may be extracted from each sound source. Then, each sound print may be compared with a preset sound print that is pre-stored for similarity. Whether the target sound source exists in the second space may be determined. In some embodiments, a sound source having a sound print with a similarity with preset sound print greater than or equal to the preset threshold may be determined as the target sound source.

When the target sound source is determined in the second space, the second image collection device may be called.

At S105, second image data in the second space is collected in real-time through the second image collection device, the second space being different from the first space.

The second space of embodiments of the present disclosure may be different from the first space, and the first space and the second space may not have an overlapped portion. That is, the first image data collected by the first image collection device and the second image data collected by the second image collection device may not repeat. That is, environment data of the first space and environment data of the second space may form the space environment of the current space where the electronic apparatus is located.

After the second image collection device is called, the second image data of the second space may be collected in real-time through the second image collection device. In some embodiments, the first image collection device and the second image collection device may be located on opposite sides of the electronic apparatus. The first image collection device and the second image collection device may face opposite directions. The collection angle of the first image collection device may be set to 180° corresponding to the side where the first image collection device is located. The collection angle of the second image collection device may be set to 180° corresponding to the side where the second image collection device is located. For example, the electronic apparatus may include a cellphone. The first image collection device may include the rear camera. The second image collection device may include the front camera. The first image collection device may be configured to collect image data of a space corresponding to a back side of the cellphone. The second image collection device may be configured to collect image data of a space corresponding to a front side of the cellphone.

The second space having the target sound source may indicate that a target user corresponding to the target sound source may exist in the second space. Therefore, the second image data in the second space collected by the second image collection device may include image data of the target user.

Further, in order to ensure that the second image collection device can entirely collect the image data of the target user, a collection direction may be determined first based on the target sound source, the relative position between the target user and the second image collection device, and a relative angle between the target user and the second image collection device. Thus, the second image collection device may collect the second image data in the collection direction to ensure that the second image collection device can entirely collect the image data of the target user. A space corresponding to the collection direction may be within the second space and smaller than the second space. The second image collection device may be turned on. After the second image data of the second space is collected by the second image collection device, an area where the target user is located in the second image data may be searched by using pre-stored image data of the target user. The second image collection device may be adjusted to further perform data collection on the area where the target user is located, which is not limited by embodiments of the present disclosure.

In embodiments of the present disclosure, the audio data may be collected in real-time by the sound collection device. The audio data may also be processed by the sound collection device. When the audio data is determined to indicate that the target sound source exists in the second space, the second image collection device may be called automatically. Thus, the second image collection device may be configured to collect the second image data of the second space. That is, during using the rear camera for recording, when the audio data is determined to indicate that user voice exists in a space corresponding to the front camera, the front camera may be turned on automatically. The user does not need to turn on the second image collection device (i.e., the front camera) manually to save time and effort, which is convenient and fast.

Figure 2:
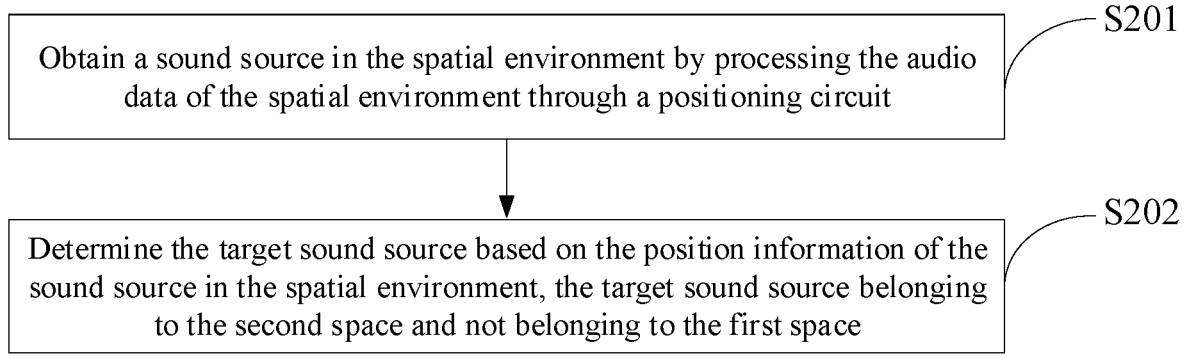
FIG. 2 illustrates a schematic flowchart showing real-time audio data processing based on an audio processing engine in the video acquisition method according to some embodiments of the present disclosure.

FIG. 2 illustrates a schematic flowchart showing real-time audio data processing based on an audio processing engine in the video acquisition method according to some embodiments of the present disclosure. The method includes obtaining a sound source in the spatial environment by processing the audio data of the spatial environment through a positioning circuit (S201), and determining the target sound source based on the position information of the sound source in the spatial environment, the target sound source belonging to the second space and not belonging to the first space (S202).

The electronic apparatus may include a positioning circuit. After the audio data is collected, the audio data may be transmitted to the positioning circuit to process the audio data of the spatial environment through the positioning circuit. Thus, the sound source may be obtained in the spatial environment. The collection distance of the sound collection device may be set to be the same as the collection distance of the first image collection device and the collection distance of the second image collection device, or the collection distance of the sound collection device may at least be set to be the same as the collection distance of the second image collection device. Thus, whether the target sound source exists in the second space may be accurately monitored. In some embodiments, the collection distance of the sound collection device may also be set to be greater than the collection distance of the second image collection device, as long as the space collected by the sound collection device may be ensured to cover the second space.

According to the above description, at least three sound collection devices are included in embodiments of the present disclosure. The three sound collection devices are used for the description below. In some embodiments, when three sound collection devices are included to collect the audio data, for a same sound source, based on the principle of triangulation, according to the intensity of the sound source collected by each sound collection device, position information of the sound source may be determined in the current space. The position information may be the distance relative to the electronic apparatus. When four or five sound collection devices are configured to collect the audio data, a corresponding algorithm may be used to determine position information of each sound source in the spatial environment according to the audio data collected by each sound collection device.

After the position information of each sound source in the spatial environment is determined, a sound source that belongs to the second space but does not belong to the first space may be selected to be the target sound source based on the angle information and the position information of the sound source calculated by the audio processing engine. The angle information may be an angle relative to the electronic apparatus. Thus, when the first image collection device operates, the first image collection device may be prevented from being turned on again to cause problems of first image data tomography.

The first mode and the second mode of the electronic apparatus are described below.

When the camera mode of the electronic apparatus is the first mode, the user may use the electronic apparatus to record a video in a specific space, such as an online class, lecture, etc. The user may place the electronic apparatus on a stand. The rear camera of the electronic apparatus (i.e., the first image collection device) may face a blackboard. The front camera of the electronic apparatus (i.e., the second image collection device) and the blackboard may face in a same direction. Thus, the collection space corresponding to the rear camera may include a space formed by a side surface of the electronic apparatus where the rear camera is located and a plan where the blackboard is located. The front camera may be another space in addition to the collection space in the specific space. When recording starts, the rear camera starts to operate. When the user starts to explain the content on the blackboard, the user needs to watch the content on the blackboard at the same time. That is, the user may face the blackboard and be at a position in another space at a certain distance from the electronic apparatus. Then, the user may start to make a sound to explain. When the audio processing engine of the electronic apparatus determines that the sound collected by the sound collection device is the voice of the user, the front camera may be automatically turned on. Thus, the rear camera and the front camera may record simultaneously. The user does not need to walk to the electronic apparatus to manually turn on the front camera, which improves the efficiency and quality of video recording.

If the user moves during a recording process, for example, the user moves to the collection space and makes a sound, but the sound is not required for the explanation, the audio processing engine may further need to calculate whether the user is currently in another space. That is, whether the voice of the user is in another space may be determined. If the voice of the user is determined to be in another space, that is, the user is in another space, the front camera may be turned on. If the voice of the user is determined to be in the collection space, that is, the user is in the collection space, the front camera may not be turned on. If in the first mode, another audience exists in another space in addition to the user, the audio processing engine may need to recognize whether the voice collected by the sound collection device is from the user or the audience to avoid false start the front camera to lead to a recording failure.

When the camera mode of the electronic apparatus is the second mode, the user may hold the electronic apparatus to introduce a scenic spot online in the scenic spot and keep the rear camera, that is the first image collection device, to obtain environmental data of the scenic spot in real-time. Then, tourists may watch online. When the tourists visit a building or scenic spot with historical records or historical facts, the user may conduct an audio introduction. Since the user moves in real-time, the audio processing engine of the electronic apparatus may perform the calculation on the sound collected by the sound collection device in real-time to ensure that the position information of the sound source is accurate. Similarly, when the audio processing engine determines that the voice of the user is within the image collection space corresponding to the front camera, the front camera may be automatically turned on. Thus, the rear camera and the front camera may record simultaneously without requiring the user to manually turn on the front camera. A situation that the electronic apparatus shakes when the user manually turns on the front camera may be avoided, which ensures the recording quality.

A corresponding third mode, fourth mode, etc., may also be set for other application scenarios, which are not limited in embodiments of the present disclosure.

Figure 3:
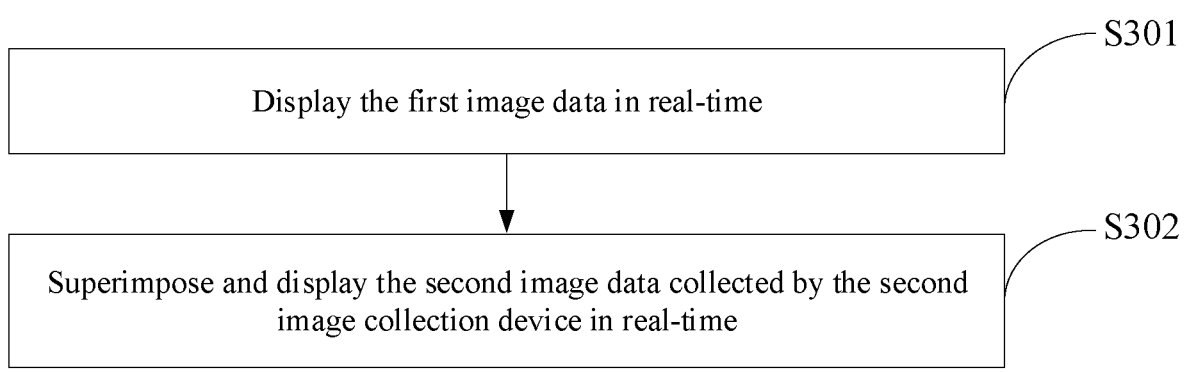
FIG. 3 illustrates a schematic flowchart showing display of first image data and second image data in the video acquisition method according to some embodiments of the present disclosure.

Further, when two or more image collection devices collect image data simultaneously, the image data collected by all the image collection devices may need to be displayed simultaneously. By considering the above situation, processing such as editing and synthesis may need to be performed later. Therefore, FIG. 3 shows a method for displaying the obtained video, which includes displaying the first image data in real-time (S301) and superimposing and displaying the second image data collected by the second image collection device in real-time (S302).

When the first image data collected by the first image collection device is received, the first image data may be displayed in real-time. The first image data of embodiments of the present disclosure may include an image corresponding to the first space.

When the second image data collected by the second image collection device is received, the second image data collected by the second image collection device in real-time may be displayed in a superimposed manner. In some embodiments, the second image data may be preprocessed, such as scaling, cropping, etc., so that the size of the second image data may be smaller than the size of and a preset ratio of the first image data. Then, the second image data may be superimposed on the first image data for display. The preset ratio may be adjusted according to actual needs.

For example, the first image data may be displayed on an entire display screen of the electronic apparatus. After receiving the second image data, the electronic apparatus may process the second image data by scaling, cropping, etc. Thus, the size of the second image data may be smaller than the display screen and be the preset ratio of the display screen. Then, the second image data may be superimposed on the first image data for display. The user may also adjust the preset ratio according to a preset operation according to actual needs of the user to cause the second image data to meet the actual needs.

For example, the user may use his cell phone to introduce the scenic spot online. When showing the scenic spot to the viewer, the user may hold the cell phone and face the front of the cell phone. Then, the cellphone may collect the first image data of the first space through the set of one or more first image collection devices and display the first image data in real-time. Meanwhile, a set of one or more sound collection devices of the cell phone may be called to collect audio data covering the spatial environment, including the first space in real-time. The first image collection device may be the rear camera. When the user needs to introduce the scenic spot, the user may start the introduction, and the sound collection device may collect audio data, including the voice information of the user. After the audio data is processed by the audio processing engine in real-time, based on a relative position between the user and the cell phone, a relative angle between the user and the cell phone, and voiceprint information of the user, the electronic apparatus may be configured to determine whether a target sound source exists in the audio data. That is, whether a voiceprint of the user exists in the audio data may be determined. If yes, the second image collection device, i.e., the front camera of the cell phone, may be automatically turned on. Meanwhile, the second image data in the second space may be collected. At this time, the image data corresponding to the user may be mainly collected. Then, the first image data may be displayed on the entire screen of the cell phone, and the second image data may be recognized. If a lot of data other than the user is included, the data other than the user may be cropped. The data corresponding to the user may be scaled to the preset ratio and superimposed on the first image data for display. In order to ensure that the viewer can fully view the scenic spot, the second image data may be displayed in an area where an edge of the first image data is located. For example, the second image data may be displayed in a lower right corner of the area where the first image data is located.

The display method of embodiments of the present disclosure may realize the purpose of displaying the first image data and the second image data simultaneously in real-time and flexibly controlling the preset ratio of the second image data. The flexibility is high, and the user experience is great. In addition, by superimposing the first image data and the second image data for display, the comfort of the viewer may also be improved.

Figure 4:
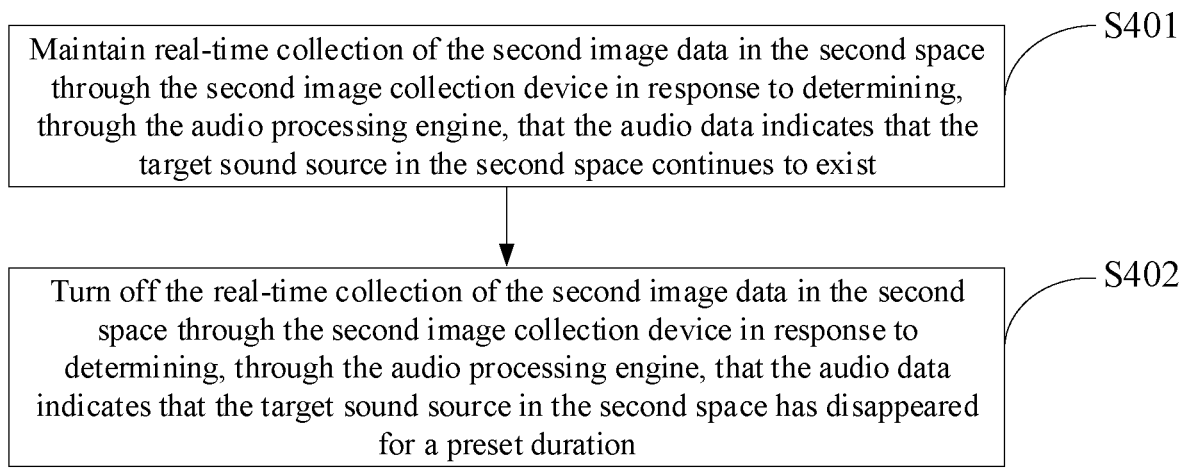
FIG. 4 illustrates a schematic flowchart showing determination of whether to turn off a second image collection device in the video acquisition method according to some embodiments of the present disclosure.

After the second image collection device is called, the audio data may also be collected in real-time by using the sound collection device. Then, whether the second image collection device needs to be turned off may be determined in real-time. In some embodiments, FIG. 4 shows a method to determine whether the second image collection device needs to be turned off. The method includes maintaining real-time collection of the second image data in the second space through the second image collection device in response to determining, through the audio processing engine, that the audio data indicates that the target sound source in the second space continues to exist (S401), and turning off the real-time collection of the second image data in the second space through the second image collection device in response to determining, through the audio processing engine, that the audio data indicates that the target sound source in the second space has disappeared for a preset duration (S402).

After the second image collection device is called, the audio data covering the spatial environment that includes the first space and the second space may be continuously collected through the sound collection device. The audio data may be processed by the audio processing engine in real-time. When the audio data is determined to indicate that the target sound source remains in the second space, the second image data of the second space may be continuously collected in real-time by the second image collection device. When the audio data is determined to indicate that the target sound source disappears for the preset duration in the second space, the real-time collection of the second image data in the second space through the second image collection device may be turned off. Thus, waste of resources caused by the display of the second image data when the second image data in the second space does not need to be displayed may be avoided. A degree of automation is high.

For example, taking the second mode as an example, when the user introduces the scenic spot online through the electronic apparatus, during the user performing voice introduction, the viewer may see pictures of the scenic spot and the tour guide on the screen. After the voice introduction, the entire screen may need to display the scenic spot, so that the viewer can watch the entire scenic spot. Therefore, the sound collection device of the electronic apparatus may continuously collect the audio data covering the spatial environment, including the first space and the second space in real-time. Once no target sound source is determined to be in the audio data, the second image collection device may be turned off. Meanwhile, the display of the second image data may be turned off on the display screen, so that the viewer can watch the entire first image data. No manual operation by the user is needed. The operation is convenient and quick, which greatly improves the user experience.

A second aspect of the present disclosure further provides an electronic apparatus corresponding to the video acquisition method. Since the principle of the device in the present disclosure for solving the problem is similar to the video acquisition method in the present disclosure, for device embodiments, reference may be made to method embodiments, the description of which is not repeated here.

Figure 5:
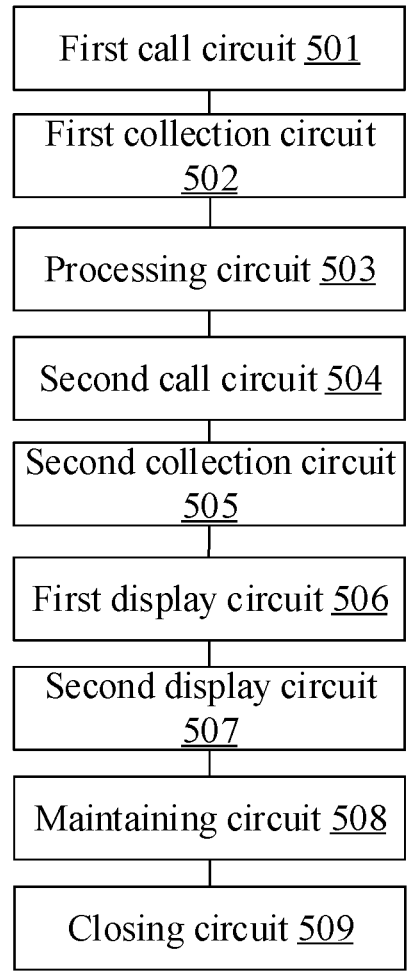
FIG. 5 illustrates a schematic structural diagram of an electronic apparatus according to some embodiments of the present disclosure.

FIG. 5 illustrates a schematic structural diagram of an electronic apparatus according to some embodiments of the present disclosure. The electronic apparatus includes a first call circuit 501, a first collection circuit 502, a processing circuit 503, a second call circuit 504, and a second collection circuit 505.

The first calling circuit 501 may be configured to call a set of one or more first image collection devices and a set of sound collection devices based on the camera mode.

The first acquisition circuit 502 may be configured to collect first image data of the first space in real-time through the first image collection device and audio data covering the spatial environment, including the first space in real-time by the sound collection device.

The processing circuit 503 may be configured to process the audio data in real-time based on an audio processing engine.

The second call circuit 504 may be configured to determine, through the audio processing engine, that the audio data represents that a target sound source exists in the second space and call the second image collection device.

The second acquisition circuit 505 may be configured to collect the second image data of the second space in real-time through the second image collection device. The second space is different from the first space.

In another embodiment, the electronic apparatus further includes a first display circuit 506 and a second display circuit 507.

The first display circuit 506 may be configured to display the first image data in real-time.

The second display circuit 507 may be configured to superimpose and display the second image data collected in real-time by the second image collection device.

In yet another embodiment, the electronic apparatus further includes a maintaining circuit 508.

The maintaining circuit 508 may be configured to maintain the real-time collection of the second image data of the second space through the second image collection device in response to determining, through the audio processing engine, that the audio data represents that the target sound source in the second space continue to exist.

In yet another embodiment, the electronic apparatus further includes a closing circuit 509.

The closing circuit 509 may be configured to turn off the real-time collection of the second image data of the second space through the second image collection device in response to determining, through the audio processing engine, that the audio data indicates that the target sound source in the second space has disappeared for the preset duration.

In yet another embodiment, the processing circuit 503 may be configured to process the audio data of the spatial environment through a positioning circuit to obtain the sound source in the spatial environment and determine the target sound source based on the position information of the sound source in the spatial environment. The target sound source belongs to the second space and does not belong to the first space.

In yet another embodiment, the processing circuit 503 determining the target sound source based on the position information of the sound source in the spatial environment includes determining the target sound source based on the position information of the sound source in the spatial environment and the sound parameter information.

The flowcharts and block diagrams in the accompanying drawings illustrate possible architecture, functions, and operations of the system, the method, and a computer program product according to embodiments of the present disclosure. Each block in the flowchart or block diagram may represent a circuit, a program segment, or a portion of code. The circuit, the program segment, or the portion of code includes one or more executable instructions for implementing a specified logical function. In some alternative embodiments, a function noted in the block may occur with a sequence different from a sequence noted in the accompanying drawings. For example, two connected blocks may be executed almost simultaneously. In some embodiments, the two connected blocks may sometimes be executed in a reverse order, depending upon the function involved. Each block and/or a combination of blocks in the block diagram and/or flowchart may be implemented by a hardware system that executes a specified function or operation or by a combination of dedicated hardware and computer instructions.

The above description includes some embodiments of the present disclosure and an illustration of the principles of the applied technology. Those skilled in the art should understand that the scope of the present disclosure is not limited to the technical solutions formed by a combination of the above technical features. The scope of the present disclosure should also cover other technical solutions formed by the above technical features or any combination of equivalents of the technical features without departing from the above-disclosed concept, for example, a technical solution formed by replacing the above features with the technical features of the present disclosure (but not limited to) with similar functions.

In addition, although operations are described in a particular order, this should not be understood as requiring that the operations should be performed in the particular order shown or in a sequential order. Under certain circumstances, multitasking and parallel processing may be beneficial. Similarly, although several implementation details are contained in the above discussion, which should not be understood as limitations on the scope of the present disclosure. Certain features that are described in the context of separate embodiments can also be implemented in combination in a single embodiment. In the contrary, various features that are described in the context of a single embodiment can also be implemented in a plurality of embodiments separately or in any suitable sub-combination.

Although the subject matter has been described in language specific to structural features and/or method logical actions, the subject matter defined in the appended claims is not necessarily limited to the specific features or actions described above. Rather, the specific features and actions described above are merely examples of implementing the claims.

The above embodiments are merely exemplary embodiments of the present disclosure and are not intended to limit the present disclosure. The scope of the present application is defined by the claims. Those skilled in the art can make various modifications or equivalent replacements to the present disclosure within the spirit and scope of the present disclosure. These modifications or equivalent replacements should also be within the scope of the present disclosure.

What is claimed is:

1. A video acquisition method comprising:
   calling a first image collection device and a sound collection device based on a camera mode;
   collecting first image data of a first space in real-time through the first image collection device;
   collecting audio data covering a spatial environment including the first space in real-time through the sound collection device;
   processing the audio data in real-time based on an audio processing engine;
   in response to determining, through the audio processing engine, that the audio data indicates that a target sound source exists in a second space different from the first space, calling a second image collection device; and
   collecting second image data of the second space in real-time through the second image collection device.

2. The method according to claim 1, further comprising:
   displaying the first image data in real-time; and
   displaying the second image data collected in real-time through the second image collection device, by superimposing the second image data over the first image data.

3. The method according to claim 2, further comprising:
   in response to determining, through the audio processing engine, that the audio data indicates that the target sound source continues to exist in the second space, maintaining real-time collection of the second image data of the second space through the second image collection device.

4. The method according to claim 2, further comprising:
   in response to determining, through the audio processing engine, that the audio data indicates that the target sound source in the second space has disappeared for a preset duration, turning off real-time collection of the second image data of the second space through the second image collection device.

5. The method according to claim 1, wherein processing the audio data in real-time based on the audio processing engine includes:
   processing the audio data of the spatial environment to obtain a sound source in the spatial environment; and
   determining the target sound source based on position information of the sound source in the spatial environment, the target sound source belonging to the second space but not the first space.

6. The method according to claim 5, wherein determining the target sound source based on the position information of the sound source in the spatial environment includes:
   determining the target sound source based on the position information of the sound source in the spatial environment and sound parameter information.

7. An electronic apparatus comprising:
   a first call circuit configured to call a first image collection device and a sound collection device based on a camera mode;
   a first collection circuit configured to collect first image data of a first space in real-time through the first image collection device and collect audio data covering a spatial environment including the first space through the sound collection device in real-time;

a processing circuit configured to process the audio data in real-time based on an audio processing engine;

a second call circuit configured to, in response to determining, through the audio processing engine, that the audio data indicates that a target sound source exists in the second space different from the first space, call the second image collection device; and a second acquisition circuit configured to collect second image data in a second space in real-time through the second image collection device.

8. The electronic apparatus according to claim 7, further comprising:

a first display circuit configured to display the first image data in real-time; and a second display circuit configured to display the second image data collected in-real time through the second image collection device, by superimposing the second image data over the first image data.

9. The electronic apparatus according to claim 8, further comprising a maintaining circuit configured to:

in response to determining, through the audio processing engine, that the audio data indicates that the target sound source continues to exist in the second space, maintain real-time collection of the second image data in the second space through the second image collection device.

10. The electronic apparatus to claim 8, further comprising a closing circuit configured to:

in response to determining, through the audio processing engine, that the audio data indicates that the target sound source in the second space has disappeared for a preset duration, turn off real-time collection of the second image data of the second space through the second image collection device.

11. The electronic apparatus to claim 7, wherein the processing circuit is further configured to:

process the audio data of the spatial environment to obtain a sound source in the spatial environment; and determine the target sound source based on position information of the sound source in the spatial environment, the target sound source belonging to the second space but not the first space.

12. The electronic apparatus according to claim 11, wherein the processing circuit is further configured to:

determine the target sound source based on the position information of the sound source in the spatial environment and sound parameter information.

13. An electronic apparatus comprising:

a processor configured to:

call a first image collection device and a sound collection device based on a camera mode;

collect first image data of a first space in real-time through the first image collection device;

collect audio data covering a spatial environment including the first space in real-time through the sound collection device;

process the audio data in real-time based on an audio processing engine;

in response to determining, through the audio processing engine, that the audio data indicates that a target sound source exists in a second space different from the first space, call a second image collection device; and collect second image data of the second space in real-time through the second image collection device.

14. The electronic apparatus according to claim 13, wherein the processor is further configured to:

display the first image data in real-time; and display the second image data collected in-real time through the second image collection device, by superimposing the second image data over the first image data.

15. The electronic apparatus according to claim 14, wherein the processor is further configured to:

in response to determining, through the audio processing engine, that the audio data indicates that the target sound source continues to exist in the second space, maintain real-time collection of the second image data in the second space through the second image collection device.

16. The electronic apparatus to claim 14, wherein the processor is further configured to:

in response to determining, through the audio processing engine, that the audio data indicates that the target sound source in the second space has disappeared for a preset duration, turn off real-time collection of the second image data of the second space through the second image collection device.

17. The electronic apparatus to claim 13, wherein the processor is further configured to:

process the audio data of the spatial environment to obtain a sound source in the spatial environment; and determine the target sound source based on position information of the sound source in the spatial environment, the target sound source belonging to the second space but not the first space.

18. The electronic apparatus to claim 17, wherein the processor is further configured to:

determine the target sound source based on the position information of the sound source in the spatial environment and sound parameter information.

* * * * *